Patented Feb. 16, 1943

2,311,386

UNITED STATES PATENT OFFICE 2,311,386

ART OF STABILIZING TALL-OIL MATERIALS

Torsten Hasselstrom, Savannah, Ga., assignor of one-half to G & A Laboratories, Inc., Savannah, Ga., a corporation of Georgia No Drawing. Application March 6, 1940, Serial No. 322,626

13 Claims. (Cl. 260—97.5)

This invention relates to a treatment of tall oil in crude, semi-refined or refined condition, by which the resin acids are subjected to stabilization by the employment of a catalyst which is capable of effecting the disproportionation of hydrogen in the resin acid molecule whereby, for example, the resin acids of the abietic type having the empirical formula $C_{20}H_{30}O_2$ are caused to yield a product which contains resin acids of the empirical formula $C_{20}H_{28}O_2$ and $C_{20}H_{32}O_2$ and having superior resistance to oxidation and other modifying effects apparently because the individual resin acids of the products have an internal structure different from those of the unstable resin acids present initially.

Crude tall oil is a by- or waste-product of the sulfate or soda processes of the pulp and paper industry. In general, the term is associated with the sulfate process. Tall oil is a complex material, the chemical composition of which is little known. It contains unsaturated fatty acids in simple or polymerized form, liquid and solid resin acids virtually unknown as to structure, and unsaponifiable matter containing sterols.

Samples of tall oil vary considerably in composition, with respect to content of resin acids, fatty acids, and unsaponifiable matters. Typical specimens of tall oil as produced in the United States show that crude tall oil may contain from 30 to 65 percent of resin acids, 40 to 60 percent of fatty acids, and up to 10 percent of unsaponifiable matters; while refined and bleached (or distilled) tall oil may contain, for example, from 35 to 40 percent of resin acids, 50 to 60 percent of fatty acids, and up to 10 percent of unsaponifiable matter. By way of specific example, a crude tall oil may have the following characteristics: 33.6 percent resin acids, 56 percent fatty acids, 8.3 percent unsaponifiable matter, iodine number 166 (modified Wijs), thiocyanogen number 74.4, acid number 154, melting point 20 degrees C., sulphur content .08 percent.

Crude tall oil has found little application in industry due to its black or dark brown color, liquidity, and stickiness, and due to its non-uniformity of chemical composition. The odor is that of pine oil products, along with a distinct smell of mercaptans, and hence is offensive and renders the product unsuitable for general commercial purposes. This material normally appears on the market in a semi-solid state, as a viscous liquid containing varying amounts of suspended solid ingredients, which makes it difficult to handle commercially. The product known to commerce as "distilled tall oil," although it may have been improved somewhat as to color, being orange to brown, still has the disadvantages of being of pine or aromatic odor (with a definite indication of mercaptans), sticky, and non-uniform in physical and chemical composition.

Ordinary rosin includes abietic acids in various stages of transformation, and upon refluxing with acetic acid or with alkali, the abietic acid part of the rosin acids are converted into Steele's abietic acid. Likewise, the abietic acid constituents of tall oil are almost exclusively present in the form of Steele's abietic acid, by reason of the treatment of the original wood with alkali in the making of sulfate pulp. The Steele's abietic acid separated from tall oil is contaminated with sterols, including 2-2-dihydrostigmasterol: and attempts to separate the Steele's abietic acid from tall oil by filtration have led to the production of such a contaminated mixture.

It has now been found that by heating the original tall oil, or the separated abietic acid constituents thereof, with iodine, it is feasible to produce a material which has far greater stability than Steele's acid.

Furthermore, it has been found that the sterols of tall oil, upon treatment with iodine, produce a product having a high melting point and differing from the original sterol, and constituting a product which resembles vitamin D.

When it is sought to purify tall oil by simple distillation, or by distillation in steam, with or without the employment of vacuum, it is not feasible to obtain a satisfactory separation into resin acid and fatty acid constituents, on account of the comparatively high boiling points of these components, and the fact that the individuals do not differ appreciably in their boiling point. The simple fractions may differ in constitution from the original constitution of the tall oil, particularly by the presence of larger proportions of fatty acids in the foreruns, whereas the later fractions contain more of the resin acids. As a specific instance of a distilled tall oil, the following may be set out: acid number, 164; unsaponification number, 173.6; moisture, none; rosin acids, 39.2; fatty acids, 52.79; unsaponifiables, 8.01; unsaturation value of fatty acids, 100 percent. Such a material is prepared from crude tall oil by distillation in vacuum, which is started by introduction of a little steam through the mixture. When the temperature and reduced pressure of distillation attain a condition at which a substantial quantity of fore-run begins to come over, the steam is cut off and the distillation continued.

Tall oil or products thereof containing the unstable materials may be treated with iodine at temperatures varying from 100 to, say, 240 degrees C., and in some instances as high as 280 degrees C., preferably employing a temperature of about 150-200 degrees C. Normally, a far-reaching decomposition of resin acids occurs at temperatures of 240 degrees C. and over, but when the resin acids are inter-dissolved in fatty acids, these resin acids are then less susceptible to decarboxylization than in ordinary rosin. The amount of catalyst used is from one-tenth to about three percent, but it is preferred to use about one-half to one percent. The conversion effect apparently is absent with quantities of catalyst below one-tenth of one percent, and an active halogenation occurs at three percent and above.

EXAMPLE I

Crude tall oil is heated with one-half percent of iodine for one hour at 160 to 200 degrees C. and thereafter left standing to cool and until the resin acids separate in a crystalline form. These resin acids consist largely of dehydroabietic acid ($C_{20}H_{28}O_2$), and on sulfonation according to Hasselstrom, U. S. Patent 2,121,032 (1938) yield about 60 percent of dehydroabietic acid sulfonate; and also contain dihydroabietic acid ($C_{20}H_{32}O_2$). The mother liquor from which these resin acids have been separated is a liquid brownish oil comprising a mixture of fatty acids of tall oil, some resin acids, unsaponifiables and sterols, and may be employed in lubricating greases, in cheap soaps, as raw material for the making of pine tree sterols, and as emulsifiers. The constituents of this liquor have undergone such change by the iodine treatment that not only the fatty acid components but also the resin acid components are capable of sulfonation. The resin acid components are stable against oxidation, as evidenced by the following table:

*Stability test*

Percentage gain of approximately 5 gram samples in oxygen stream)

| Hours | Steele's acid | Pinabietic acid | Dehydroabietic acid | Gum rosin | Iodine treated rosin | Crystals from iodine treated tall oil resin |
|---|---|---|---|---|---|---|
| | Per cent | Per cent | Per cent | Per cent | Per cent | Per cent |
| 24 | 0.564 | 0.162 | 0.000 | 0.292 | −0.082 | −0.032 |
| 48 | 0.823 | 0.116 | −0.018 | 0.080 | −0.050 | −0.018 |
| 72 | 0.978 | 0.156 | −0.008 | 0.178 | −0.008 | −0.008 |
| 96 | 1.070 | 0.112 | −0.004 | 0.148 | −0.016 | −0.016 |
| 120 | 0.892 | 0.134 | +0.006 | 0.154 | +0.012 | 0.000 |
| 144 | 0.876 | 0.130 | 0.000 | 0.156 | −0.002 | 0.002 |
| 168 | 0.760 | 0.134 | 0.002 | 0.232 | 0.002 | 0.002 |

The Steele's abietic acid was obtained by liberation from sodium tetra-abietate $$(\alpha)_D = -97.2°$$

and had a melting point 164-7°, and rotation $(\alpha)_D = -93.2°$. A 5.0001 gram sample was used.

The pinabietic acid was twice recrystallized from the crude. It has a melting point of 164.5-9°, and rotation $(\alpha)_D = -23.7°$. A 5.0002 gram sample was used.

The dehydroabietic acid has a melting point of 169-72°, and rotation $(\alpha)_D = +72.7°$. A 5.0008 gram sample was used.

The gum rosin had a melting point of 81° (A. S. T. M. ball and ring method), and rotation $(\alpha)_D = +11.6°$. A 5.0013 gram sample was used.

The iodine treated rosin, according to the Hasselstrom and Brennan application 108,308, had a melting point of 67° (A. S. T. M. ball and ring method), and rotation $(\alpha)_D = +32.6°$. A 4.9981 gram sample was used.

The crystals from iodine treated resin were twice crystallized, had a rotation $$(\alpha)_D = +53.6°$$

and a melting point of 162-168°. A 5.0000 gram sample was used.

EXAMPLE II

Crude tall oil heated with iodine in the same manner as in Example I is subjected to fractional distillation in vacuum and a novel tall oil product is obtained, the resin acid part of the distillate consisting substantially of dehydroabietic acid ($C_{20}H_{28}O_2$), along with dihydroabietic acid as before, and as such is more stable against oxidation and deterioration; and such a tall oil distillate may advantageously be employed in soaps and other materials. In vacuum distilling at 11 millimeters, the fore-run boiling below 200 degrees C. amounts to about 15 percent and contains mainly mixtures of terpenes, polyterpenes, and other saponifiables. The main fraction distilling at 200-240 degrees C. comprises about 75 percent in total, and contains a tall oil having a resin acid content which is substantially all dehydroabietc acid ($C_{20}H_{28}O_2$). The residue from this fractional distillation is a brownish-black liquid and amounts to about 10 percent of the total. The main fraction separates, on standing, a solid which is substantially dehydroabietic acid, contaminated with minor quantities of fatty acids and sterols. The dehydroabietic acid can be separated by filtration, followed by recrystallization from a convenient solvent such as methanol. The remaining liquid of this main fraction is a refined tall oil and sterol which contains some dehydroabietic acid but is substantially devoid of Steele's abietic acid, and is highly stable.

EXAMPLE III

Crude tall oil is permitted to stand, and separates crystals of Steele's abietic acid. These crystals are filtered. The press cake is an unstable tall oil product which contains Steele's acid with unseparated impurities. It is melted and brought to a temperature of 160 to 200 degrees C.; one-half percent of iodine is added, and the heating continued for substantially one hour. The material is cooled, and permitted to stand: it then separates a product which can be separated and recrystallized from methanol, and contains dehydroabietic acid of high purity and stability.

EXAMPLE IV

Crude tall oil is permitted to stand, for separating crystals of Steele's abietic acid, which are removed therefrom and the filtrate is heated with one-half percent of iodine for one hour at 160 to 200 degrees C. This filtrate is an unstable tall oil product, and as brought to treatment is a liquid brownish oil which contains a mixture of fatty acids of tall oil, with some resin acids (including Steele's abietic acid), unsaponifiables and sterols. Upon the iodine treatment, the stability is greatly improved, as the remaining Steele's abietic acid thereof is converted to dehydroabietic acid ($C_{20}H_{28}O_2$), and other components are also acted upon. The product may be employed in lubricating greases, and in cheap soaps.

EXAMPLE V 500 grams of tall oil were heated to about 180 degrees C. One percent of iodine was added twenty minutes after original heating, and the temperature raised to about 190 to 200 degrees C., and this temperature maintained for about two hours. The material was permitted to cool to about 50 degrees C., and then 500 cc. of methanol and 50 cc. of concentrated sulfuric acid were added. The mixture was refluxed for about one hour, and then 300 cc. of methanol was distilled off. The remaining mixture was shaken three times, with a ten percent solution of sodium chloride; and the aqueous layer removed: the mixture of resin acid and fatty acid ester was dissolved in twice its weight of benzene, and the benzene solution was treated with four liters of one percent sodium hydroxide solution. On standing, two layers were separated, and the benzene layer was removed and dried over anhydrous sodium sulfate. The benzene was distilled away, and the residue was fractionated in vacuum: this contains fatty acid esters and unsaponifiables, and the following fractions were obtained at 4 mm. pressure:

| Fraction | Boiling point | Yield in grams |
|---|---|---|
| | Degrees | |
| I | 185-189 | 102 |
| II | 189-193 | 80 |
| III | 193-203 | 10 |
| IV | 203-240 | 13 |
| V | Residue | 47 |
| Total | | 252 |

The aqueous layer separated from the benzene layer contains resin soaps and was acidified with dilute and sulfuric acid and the precipitated resin acids removed. The total yield of crude rosin acids was about 250 grams. This crude rosin acid material was then dissolved and recrystallized three times from methanol, yielding a product consisting substantially of dehydroabietic acid and having a melting point of 173–175 degrees C., and an optical rotation (alpha)$_D$+54.1. (Pure dehydroabietic acid has a melting point of 169–172 degrees C., with an optical rotation (alpha)$_D$+72.7). On sulfonating the crude rosin acid constituent in accordance with the procedure of the Hasselstrom Patent 2,121,032, a yield of sixty percent of dehydroabietic acid sulfonate was obtained, with a melting point of 223 to 224 degrees C. (with decomposition).

EXAMPLE VI

When vacuum-distilled tall oil containing about 10 to 65 percent of resin acids which are of the composition $C_{20}H_{30}O_2$, is subjected to treatment with one-half percent of iodine at 150 degrees C. for one hour, the resin acids of such treated material contain up to 6 to 60 percent of dehydroabietic acid.

The material is then saponified by treatment with caustic soda or sodium carbonate solution to yield a stable detergent product which consists of a mixture of modified tall oil substances substantially in the naturally occurring proportions, and comprises a mixture of sodium resinates and sodium oleate, which is highly stable by reason of the treatment undergone and is highly effective as an emulsifier.

The treatment of the tall oil and tall oil products with iodine results in the conversion of unstable abietic acids, such as Steele's abietic acid, to the stable form of dehydroabietic acid ($C_{20}H_{28}O_2$): and also there is a change in the fatty acids of the tall oil, as the iodine number thereof is reduced, and apparently the highest unsaturated fatty acids have undergone a change. However, the displaced hydrogen of the unstable resin acids (such as Steele's abietic acid) which have undergone disproportionation, has not all entered the most unsaturated compounds (such as the fatty acids of the linolenic and linoic types which are present), as a subsequent sulfonation of the material indicates that dihydroabietic acid is present, and the lactone of hydroxytetrahydroabietic acid is present in the sulfonate, apparently due to hydration of dihydroabietic acid.

Further, it is found that the treatment of crude and refined tall oils results in the removal of the odor of the mercaptans, apparently accompanied by conversion into non-smelling dialkyl disulphides. Hence, the original mercaptan odor of the tall oil is eliminated.

It is obvious that the invention is not limited to the specific examples set forth, but can be employed in many ways within the scope of the appended claims for effecting the stabilization of crude tall oil or tall oil products which contain the unstable materials.

I claim:

1. The process of obtaining from tall oil a material containing stable resin acid, which comprises the step of heating a tall oil containing an unstable resin acid component including Steele's abietic acid with $\frac{1}{10}$ to 3 percent of iodine at a temperature of 100 to 240 degrees C. for a time of substantially one to two hours until Steele's abietic acid has substantially disappeared.

2. The process of obtaining from tall oil a material containing a stable resin acid, which comprises the step of heating the same to a temperature of 100 to 280 degrees C. in the presence of $\frac{1}{10}$ to 3 percent of iodine until Steele's abietic acid has substantially disappeared.

3. The process of obtaining from tall oil a material containing stable resin acid, which comprises the step of heating the same to a temperature of 160 to 200 degrees C. in the presence of substantially ½ to 1 percent of iodine for substantially one to two hours.

4. The process of obtaining from tall oil a stable resin acid, which comprises heating the same to a temperature of substantially 160 to 200 degrees C. in the presence of substantially ½ to 1 percent of iodine for substantially one to two hours, cooling and crystallizing and separating the crystals as a stable resin acid material.

5. The process of obtaining from tall oil a stable resin acid, which comprises heating the same to a temperature of substantially 160 to 200 degrees C. in the presence of substantially ½ to 1 percent of iodine for substantially one to two hours, fractionally distilling in vacuum, and recovering the fraction having a boiling point of substantially 200 to 240 degrees C. under a pressure of eleven millimeters.

6. The process of obtaining from tall oil a stable material containing stable resin acid, which comprises permitting the tall oil to deposit crystals, separating the crystals of resin acid from the liquor, and heating the liquor to a temperature of substantially 160 to 200 degrees C. in the presence of substantially ½ to 1 percent of iodine for substantially one to two hours.

7. The process of obtaining from tall oil a stable material containing stable resin acids, which comprises permitting the tall oil to deposit crystals, separating the crystals, and heating the residue to a temperature of substantially 160 to 200 degrees C. in the presence of substantially ½ to 1 percent of iodine for substantially one to two hours.

8. The process of obtaining a stable pure resin acid from tall oil, which comprises heating the tall oil to a temperature of substantially 160 to 200 degrees C. in the presence of ½ to 1 percent of iodine for a time of substantially one to two hours, esterifying by an action of an alcohol in the presence of a concentrated inorganic acid while heating, forming separate aqueous and non-aqueous layers by standing, dissolving the non-aqueous material in a hydrocarbon solvent and saponifying by the action of an alkali, separating by standing and acidifying the aqueous layer and recovering resin acids therefrom.

9. The process of obtaining from tall oil a material containing the radicals of stable resin acid, which comprises the step of heating a tall oil containing an unstable resin acid component comprised at least in part of Steele's abietic acid with $\frac{1}{10}$ to 3 per cent of iodine at a temperature of 100 to 240 degrees C. for a time of substantially one to two hours until Steele's abietic acid has substantially disappeared.

10. The process of obtaining from tall oil a material containing the radicals of stable resin acid, which comprises the step of heating the same to a temperature of 150 to 200 degrees C. in the presence of substantially ½ to 1 per cent of iodine for substantially one to two hours.

11. A composition consisting essentially of tall oil fatty acids, resin acids, and the unsaponifiables naturally present in tall oil, said tall oil fatty acids and resin acids being in essentially the proportion to one another and to the total composition as in tall oil, and being the product of heating tall oil in the presence of $\frac{1}{10}$ to 3 per cent of iodine to a temperature of 150 to 200 degrees C., the fatty acid component being substantially identical with the fatty acid component of tall oil, the resin acids consisting essentially of dehydroabietic acid and also containing dihydroabietic acid but being substantially free of Steele's abietic acid, and being characterized by its stability against oxidation.

12. A composition comprising a mixture of tall oil fatty acids and of resin acids in essentially the proportion to one another and to the total composition as in tall oil, and being the product of heating tall oil in the presence of $\frac{1}{10}$ to 3 per cent of iodine to a temperature of 150 to 200 degrees C., the fatty acid component including parts which are substantially identical with the more saturated fatty acids of tall oil and as a whole containing less of the highly unsaturated fatty acids of tall oil, the resin acid component consisting essentially of dehydroabietic and dihydroabietic acids and being substantially free of Steele's abietic acid, such compound being characterized by its stability against oxidation.

13. A stable composition obtained from tall oil and consisting of a mixture of compounds containing the radicals of resin and fatty acids, said acids being substantially free from Steele's abietic acid and from the more unsaturated fatty acids of tall oil, and being the product of heating tall oil in the presence of substantially ½ per cent of iodine to a temperature of substantially 150 degrees C. for one hour, said resin and fatty acids being present in essentially the relative proportion to one another and to the total composition as in tall oil, from 6 to 60 per cent of the resin acids being dehydroabietic acids, the composition also including the other components of tall oil substantially in the natural proportion thereof relative to said acids and in the form produced by heating the said other components with iodine.

TORSTEN HASSELSTROM.